(12) United States Patent
Okuda et al.

(10) Patent No.: US 7,923,074 B2
(45) Date of Patent: Apr. 12, 2011

(54) METHOD FOR PREPARING A VEHICLE INTERIOR MATERIAL

(75) Inventors: Harukazu Okuda, Echizen (JP); Ichiro Tanii, Echizen (JP); Norio Nakamura, Echizen (JP); Kazuyuki Matsumura, Annaka (JP); Akira Yamamoto, Annaka (JP); Toshiaki Ihara, Annaka (JP)

(73) Assignee: Nissin Chemical Industry Co., Ltd., Echizen-shi (JP)

( * ) Notice: Subject to any disclaimer, the term of this patent is extended or adjusted under 35 U.S.C. 154(b) by 0 days.

(21) Appl. No.: 12/832,807

(22) Filed: Jul. 8, 2010

(65) Prior Publication Data

US 2010/0272911 A1 Oct. 28, 2010

Related U.S. Application Data

(62) Division of application No. 11/636,471, filed on Dec. 11, 2006, now abandoned.

(30) Foreign Application Priority Data

Dec. 12, 2005 (JP) .................................. 2005-357289

(51) Int. Cl.
*B05D 3/00* (2006.01)
(52) U.S. Cl. .................. 427/393.3; 427/372.2; 427/379; 427/389; 427/389.9; 427/393.4
(58) Field of Classification Search ............... 427/372.2, 427/379, 389, 389.9, 393.3, 393.4
See application file for complete search history.

(56) References Cited

U.S. PATENT DOCUMENTS

| | | | | |
|---|---|---|---|---|
| 4,118,433 | A | * | 10/1978 | Innes .............................. 585/728 |
| 5,286,759 | A | * | 2/1994 | Smits et al. .................... 521/131 |
| 6,586,059 | B1 | | 7/2003 | Michiels |
| 2005/0277711 | A1 | | 12/2005 | Takahata et al. |
| 2006/0192186 | A1 | | 8/2006 | Matsumura et al. |
| 2006/0240257 | A1 | * | 10/2006 | Schwantes et al. ........ 428/402.2 |

FOREIGN PATENT DOCUMENTS

| | | |
|---|---|---|
| CN | 1637063 A | 10/2008 |
| EP | 1564243 A1 | 8/2005 |
| JP | A-8-134455 | 5/1996 |
| JP | 9-13037 A | 1/1997 |
| JP | 10-110083 A | 4/1998 |
| JP | 2003-171878 A | 6/2003 |
| JP | 2005-179642 A | 7/2005 |

OTHER PUBLICATIONS

Chinese Office Action dated Mar. 8, 2010, and English Translation thereof.

* cited by examiner

*Primary Examiner* — Peter Szekely
(74) *Attorney, Agent, or Firm* — Birch, Stewart, Kolasch & Birch, LLP

(57) ABSTRACT

A method for preparing a vehicle interior material comprises the steps of feeding 100 parts by weight of phosphorus and nitrogen-containing non-halogen flame retardant particles and 0.1 to 20 parts by weight of hydrophobic inorganic oxide fine particles having hydrophobic groups and having an average particle size of 0.001 to 5 μm to a mixer equipped with a high-speed agitation means having a revolution capability of about 100 to 5,000 rpm, agitating and mixing the phosphorus and nitrogen-containing non-halogen flame retardant particles and the hydrophobic inorganic oxide fine particles to produce the phosphorus and nitrogen-containing non-halogen flame retardant particles coated with the hydrophobic inorganic oxide fine particles, mixing 100 parts by weight as solids of a synthetic resin emulsion and 1 to 300 parts by weight of the phosphorus and nitrogen-containing non-halogen flame retardant particles coated with the hydrophobic inorganic oxide fine particles to produce a coating composition, coating the coating composition onto the vehicle interior material, and drying the coated vehicle interior material.

12 Claims, No Drawings

METHOD FOR PREPARING A VEHICLE INTERIOR MATERIAL

CROSS-REFERENCE TO RELATED APPLICATION

This application is a Divisional of application Ser. No. 11/636,471 filed on Dec. 11, 2006 now abandoned, and for which priority is claimed under 35 U.S.C. §120; and this to application claims priority of Application No. 2005-357289 filed in Japan on Dec. 12, 2005 under 35 U.S.C. §119; the entire contents of all are hereby incorporated by reference.

TECHNICAL FIELD

This invention relates to a method for preparing a vehicle interior materials such as car seats, car mats, and ceiling members, and vehicle interior materials coated therewith.

BACKGROUND ART

Most coating agents applied to vehicle interior materials such as car seats, car mats, and ceiling members in the prior art are halogenated flame retardants such as decabromodiphenyl ether for imparting flame retardance. The recent concern about the environment demands to replace conventional halogenated flame retardants by non-halogen flame retardants. The non-halogen flame retardants, however, have drawbacks of poor flame retardance and poor water resistance, as compared with the halogenated flame retardants.

To overcome these problems, an attempt was made to encapsulate a water-soluble non-halogen flame retardant such as ammonium polyphosphate with a coating agent. JP-A 9-13037 discloses such a coating agent comprising a polyamide resin, acrylic resin or styrene resin although the resulting flame retardant is still less resistant to water.

JP-A 10-110083 and JP-A 2003-171878 disclose that ammonium polyphosphate particles can be admixed with acrylic emulsions in a stable manner when they are surface coated with melamine resins or the like. The emulsion compatibility is improved. However, if the coating agent has a low degree of curing, coatings applied and dried to substrates, typically fabrics are not improved in water resistance. For example, a problem has been pointed out that the coating surface becomes slimy when contacted with water. On the other hand, if the coating agent has a higher degree of curing, the above problem is overcome, but formaldehyde is detectable, raising an environmental problem.

In addition to the ammonium polyphosphate, the known non-halogen flame retardants include metal hydroxides such as aluminum hydroxide and magnesium hydroxide and phosphate esters, which are considered less flame retardant than the halogenated flame retardants.

There exists a need for coating compositions comprising non-halogen flame retardants having physical properties comparable to coating compositions comprising conventional halogenated flame retardants.

SUMMARY OF THE INVENTION

An object of the present invention is to provide a coating composition for use with vehicle interior materials such as car seats, car mats, and ceiling members, comprising a non-halogen flame retardant, which composition has physical properties comparable to coating compositions comprising conventional halogenated flame retardants. Another object is to provide a vehicle interior material coated with the coating composition.

The inventors have found that when a certain amount of a non-halogen flame retardant in which non-halogen flame retardant particles are surface coated with hydrophobic inorganic oxide fine particles is added to a synthetic resin emulsion, there is obtained a novel coating composition comprising a non-halogen flame retardant, which composition has physical properties comparable to coating compositions comprising conventional halogenated flame retardants. This coating composition is suitable to apply to vehicle interior materials such as car seats, car mats, and ceiling members.

Therefore, the present invention provides a coating composition comprising a synthetic resin emulsion and one or more non-halogen flame retardant in which phosphorus and nitrogen-containing non-halogen flame retardant particles are surface coated with hydrophobic inorganic oxide fine particles, the coated non-halogen flame retardant being added in an amount of 1 to 300 parts by weight per 100 parts by weight as solids of the synthetic resin emulsion. A vehicle interior material coated with the composition is also contemplated.

BENEFITS OF THE INVENTION

The coating composition comprising a non-halogen flame retardant according to the invention has physical and flame retardant properties comparable to coating compositions comprising conventional halogenated flame retardants and is thus suitable to apply to vehicle interior members such as car seats, car mats and ceiling members.

DESCRIPTION OF THE PREFERRED EMBODIMENTS

The coating composition of the invention is defined as comprising a synthetic resin emulsion and a non-halogen flame retardant in which phosphorus and nitrogen-containing non-halogen flame retardant particles are surface coated with hydrophobic inorganic oxide fine particles, which retardant is simply referred to as "coated non-halogen flame retardant," hereinafter. The coated non-halogen flame retardant is added in an amount of 1 to 300 parts by weight per 100 parts by weight of solids of the synthetic resin emulsion.

Emulsion

The synthetic resin emulsions used herein include vinyl chloride resin base emulsions, (meth)acrylate resin base emulsions, styrene/acrylate copolymer base emulsions, urethane resin base emulsions, silicone resin base emulsions, fluororesin base emulsions, epoxy resin base emulsions, ethylene/vinyl acetate copolymer base emulsions, and rubber base emulsions such as styrene-butadiene rubber (SBR) and acrylonitrile-butadiene rubber (NBR) base emulsions. These emulsions may be used alone or in admixture of two or more. Preference is given to (meth)acrylate resin base emulsions, styrene/acrylate copolymer base emulsions, urethane resin base emulsions, ethylene/vinyl acetate copolymer base emulsions, and rubber base emulsions such as SBR and NBR. It is noted that the term "(meth)acrylate resin" refers to acrylate or methacrylate resins.

The above-listed synthetic resin emulsions may be synthesized by emulsion polymerization. Instead, any of commercially available synthetic resin emulsions may be used. Examples of commercially available synthetic resin emulsions include, but are not limited to, (meth)acrylate resin base emulsions such as Vinyblan 2598 by Nisshin Chemical Co., Ltd. and Aron A-104 by Toa Synthesis Co., Ltd.; styrene/ acrylate copolymer base emulsions such as Vinyblan 2590 by Nisshin Chemical Co., Ltd. and Movinyl 975A by Clariant Polymer Co., Ltd.; urethane resin base emulsions such as Hydran HW-311 and HW-301 by Dainippon Ink & Chemicals, Inc. and Permarine UA-150 by Sanyo Chemical Industry Co., Ltd.; ethylene/vinyl acetate copolymer base emulsions such as Sumikaflex 400 and 752 by Sumitomo Chemical Co., Ltd. and Panflex OM-4000 by Kurare Co., Ltd.; and rubber base emulsions such as Nalstar SR-100 and SR-112 by Nippon A&L Inc. and Nipol 1561 by Nippon Zeon Co., Ltd.

When the foregoing synthetic resin emulsions are prepared by emulsion polymerization, radical polymerization is generally employed for synthesis. The starting monomers used are monomers containing unsaturated groups having a radical polymerization ability.

Examples of suitable unsaturated group-containing monomers include ethylene and propylene; chlorine-containing monomers such as vinyl chloride and vinylidene chloride; vinyl carboxylate monomers such as vinyl acetate and vinyl propionate; aromatic vinyl monomers such as styrene and α-methylstyrene; conjugated diene monomers such as 1,3-butadiene and 2-methyl-1,3-butadiene; ethylenically unsaturated monocarboxylic acid esters such as methyl acrylate, ethyl acrylate, butyl acrylate, 2-ethylhexyl acrylate, and methyl methacrylate; ethylenically unsaturated dicarboxylic acid esters such as dimethyl itaconate, diethyl maleate, monobutyl maleate, monoethyl fumarate, and dibutyl fumarate; ethylenically unsaturated monocarboxylic acids such as acrylic acid, methacrylic acid and crotonic acid; ethylenically unsaturated dicarboxylic acids such as itaconic acid, maleic acid, and fumaric acid; epoxy group-containing monomers such as glycidyl methacrylate; alcoholic hydroxyl group-containing monomers such as 2-hydroxyethyl methacrylate; alkoxyl group-containing monomers such as methoxyethyl acrylate; nitrile group-containing monomers such as acrylonitrile; amide group-containing monomers such as acrylic amide; amino group-containing monomers such as dimethylaminoethyl methacrylate; and monomers having at least two ethylenically unsaturated groups in a molecule such as divinyl benzene and allyl methacrylate.

For the emulsion polymerization, any well-known emulsion polymerization techniques may be employed. The foregoing monomers and polymerization aids (e.g., emulsifiers such as alkyl sulfate salts, polymerization initiators such as ammonium persulfate, chain transfer agents such as mercaptans, pH regulators such as sodium carbonate, antifoaming agents) may be added together at the initial, or continuously over the course. Alternatively, some of them may be added continuously or in divided portions during the polymerization.

Suitable emulsifiers used in the emulsion polymerization include surfactants of the following classes (1) to (4), which may be used alone or in admixture of two or more.
(1) Anionic surfactants, such as alkyl sulfate ester salts, polyoxyethylene alkyl ether sulfate ester salts, alkylbenzene sulfonate salts, alkyldiphenylether disulfonate salts, alkyl naphthalene sulfonate salts, fatty acid salts, dialkylsulfosuccinate salts, alkylphosphate salts, polyoxyethylene alkylphenyl phosphate ester salts.
(2) Nonionic surfactants, such as polyoxyethylene alkyl phenyl ethers, polyoxyethylene alkyl ethers, polyoxyethylene fatty acid esters, sorbitan fatty acid esters, polyoxyethylene sorbitan fatty acid esters, polyoxyalkylene alkyl ethers, polyoxyethylene derivatives, glycerin fatty acid esters, polyoxyethylene hardened castor oil, polyoxyethylene alkyl amines, alkyl alkanol amides, or acetylene alcohol, acetylene glycol and ethylene oxide addition products thereof.
(3) Cationic surfactants, such as alkyl trimethylammonium chlorides, dialkyl dimethylammonium chlorides, alkylbenzylammonium chlorides, and alkylamine salts.
(4) Polymerizable surfactants having a double bond with a radical polymerization ability in a molecule, such as alkylallylsulfosuccinic acid salts, methacryloyl polyoxyalkylene sulfate ester salts, polyoxyethylene nonylpropenylphenyl ether sulfate ester salts.

These surfactants are generally used in amounts of 0.3 to 20% by weight, preferably 0.5 to 10% by weight based on the weight of the monomers.

Examples of the polymerization initiator used for the emulsion polymerization include persulfates such as ammonium persulfate, potassium persulfate; azo compounds such as 2,2'-diamidino-2,2'-azopropane dihydrogen chloride salt and azobisisobutyronitrile; and peroxides such as cumene hydroperoxide, benzoyl peroxide and hydrogen peroxide. Well-known redox initiators such as potassium persulfate and sodium hydrogen sulfite are also useful. The amount of the polymerization initiator used is generally 0.1 to 5% by weight, preferably 0.2 to 2% by weight based on the weight of the monomers.

The emulsion polymerization is generally conducted at a temperature of 10 to 90° C., desirably 50 to 80° C. and for a time of about 3 to about 20 hours. This polymerization is desirably conducted in an atmosphere of an inert gas such as nitrogen gas.

Flame Retardant

The flame retardant used in the coating composition of the invention is a non-halogen flame retardant in which phosphorus and nitrogen-containing non-halogen flame retardant particles are surface coated with hydrophobic inorganic oxide fine particles.

Flame retardants containing only phosphorus include, for example, phosphoric acid esters, but are less flame retardant than the halogenated flame retardants. The inventors select as the flame retardant component a flame retardant containing both phosphorus and nitrogen for achieving an improved flame retardant effect.

Examples of the phosphorus and nitrogen-containing non-halogen flame retardant include guanidine phosphate, ammonium phosphate, melamine phosphate, ammonium polyphosphate, ammonium polyphosphate surface treated with melamine, and ammonium polyphosphate surface treated with silicon compounds, which may be used alone or in admixture of two or more. Inter alia, ammonium polyphosphates are preferred. Useful ammonium polyphosphates are commercially available. These flame retardants are in the form of particles, preferably having an average particle size of 3 to 25 μm, especially 5 to 18 μm. It is noted that the average particle size is determined as a weight average value or median diameter, for example, using a particle size distribution analyzer relying on the laser light diffraction technique. The silicon compound-surface-treated ammonium polyphosphate is preferably obtained by treating or coating surfaces of ammonium polyphosphate particles with an alkoxysilane containing a functional group such as carboxyl or amino group or a partial hydrolyzate thereof, using an in-liquid drying process.

It has been found that excellent water repellency is exerted by coating surfaces of phosphorus and nitrogen-containing non-halogen flame retardant particles with hydrophobic inorganic oxide fine particles.

The hydrophobic inorganic oxide fine particles used herein are not particularly limited as long as they are hydrophobic inorganic oxides (i.e., having hydrophobic groups). Examples include, but are not limited to, hydrophobic silicon oxide, titanium oxide, zinc oxide, aluminum oxide, and cerium oxide. Inter alia, hydrophobic silicon oxide or silica is best suited from the cost and performance aspects.

The silica which can be used herein is generally divided into two types: dry silicas which are typically obtained by decomposition of silicon halides or by heat reduction of silica sand followed by oxidation in air; and wet silicas which are typically obtained by direct decomposition of sodium silicate with mineral acids such as sulfuric acid. Silica produced by a sol-gel method involving hydrolysis of alkoxysilanes is also acceptable. Any type of silica is useful as long as it has been provided with hydrophobic groups such as alkyl groups, typically methyl, by treating with hydrophobic surface-treating agents including organosilazanes such as hexamethyldisilazane, organoalkoxysilanes such as methyltrimethoxysilane, and organopolysiloxanes such as organohydrogenpolysiloxanes.

A measure of hydrophobicity is preferably represented by a degree of hydrophobicity, which is at least 45, preferably 50 to 70. The degree of hydrophobicity is determined by a methanol titration test of adding silica fine particles to a methanol/water mixture for wetting the fine particles, and determining the percentage of methanol in the methanol/water mixture, as shown below.

[Measurement of Hydrophobicity]
(1) Charge 0.2 g of sample to a 500 ml-flask.
(2) Add 50 ml of deionized water thereto and agitate the mixture with a stirrer.
(3) Drop methanol to the mixture from a buret while agitating, and read the dropping amount of methanol when sample is wholly dispersed to deionized water.
(4) Calculate hydrophobicity from the following equation.

$$Hydrophobicity = A \times 100/(A+B)$$

wherein
A is titer of methanol (ml)
B is amount of deionized water (ml)

Lager values indicate higher hydrophobicity whereas smaller values indicate higher hydrophillicity.

The hydrophobic inorganic oxide fine particles, typically hydrophobic silica fine particles have an average particle size sufficient to deposit on the phosphorus and nitrogen-containing non-halogen flame retardant particles, preferably from 0.001 to 5 μm. An average particle size of 0.001 to 2 μm is more preferred. The shape of fine particles is not particularly limited and may be spherical or irregular.

Surfaces of the non-halogen flame retardant particles can be coated with the hydrophobic inorganic oxide fine particles by feeding 100 parts by weight of non-halogen flame retardant particles and 0.1 to 20 parts by weight, preferably 1 to 10 parts by weight of hydrophobic inorganic oxide fine particles to a suitable mixer such as a ball mill, V-type mixer, ribbon mixer, or screw mixer, equipped with a high-speed agitation means having a revolution capability of about 100 to 5,000 rpm where they are agitated and mixed. Then the hydrophobic inorganic oxide fine particles deposit on and adhere to surfaces of the non-halogen flame retardant particles, yielding a coated non-halogen flame retardant.

The coated non-halogen flame retardant preferably has an average particle size of 3 to 35 μm, especially 5 to 20 μm. In the practice of the invention, one or more coated non-halogen flame retardants may be used.

The synthetic resin emulsion and the coated non-halogen flame retardant (i.e., phosphorus and nitrogen-containing non-halogen flame retardant particles surface coated with hydrophobic inorganic oxide fine particles) are mixed in such a proportion that 1 to 300 parts by weight, preferably 5 to 200 parts by weight of the coated non-halogen flame retardant is present per 100 parts by weight as solids of the synthetic resin emulsion. Less than 1 part of the flame retardant provides an insufficient flame retardant effect whereas more than 300 parts of the flame retardant fails to provide a coating with a practical strength and increases the cost.

In addition to the above-mentioned components, the coating composition of the invention may contain additives, for example, cellulosic water-soluble polymers such as hydroxymethyl cellulose, hydroxyethyl cellulose, carboxymethyl cellulose and methyl cellulose; synthetic water-soluble polymers such as fully saponified polyvinyl alcohol, partially saponified polyvinyl alcohol, polyacrylic acid and salts thereof, polymethacrylic acid and salts thereof, polyacrylamide, and alkali viscosity buildup type acrylic emulsions; bases such as ammonia, triethylamine, and sodium hydroxide; polyethylene wax, anti-foaming agents, leveling agents, tackifiers, preservatives, anti-bacterial agents, and anti-rusting agents as long as they do not compromise the objects of the invention.

The coating composition of the invention is prepared by intimately mixing predetermined amounts of the foregoing components in a conventional manner. The coating composition thus obtained should preferably have a solids content of 30 to 70% by weight, more preferably 40 to 60% by weight.

The coating composition thus obtained is advantageously applicable to various substrates which must be rendered flame retardant, for example, vehicle interior materials such as car seats, car mats and ceiling members.

In applying the coating composition to substrates, any of well-known applicators, such as gravure roll coaters, knife coaters, and reverse roll coaters may be used. The substrates include woven fabrics and knitted goods of polyester, nylon or the like and non-woven fabrics of polyester, polypropylene or the like.

In applying the coating composition to substrates, the composition may be used as such or after thickening with commercially available thickeners such as alkali viscosity buildup type acrylic emulsions. On use, the coating composition should preferably be adjusted to a viscosity of 10,000 to 50,000 mPa·s at 25° C., more preferably 20,000 to 40,000 mPa·s at 25° C., as measured by a Brookfield viscometer.

The coating weight of the coating composition is generally 30 to 600 g/m², desirably 50 to 500 g/m², in a dry state. After application, the coating is desirably dried at a temperature of about 100 to 180° C. for about 1 to 10 minutes.

Typical vehicle interior materials are car seats, car mats and ceiling members, for which not only flame retardance, but also texture are key features. The texture is measured by the 45 degree cantilever method of JIS L1079 and expressed by stiffness. The texture requirement differs depending on the identity of vehicle interior material. In the case of car seats, a soft texture is required as expressed by a stiffness less than or equal to 100. In the case of car mats and ceiling members, on the other hand, a hard texture is required as expressed by a stiffness of greater than 100. In general, the coating weight of the coating composition is desirably 30 to 200 g/m² in a dry state in the case of car seats, and the coating weight is desirably 300 to 600 g/m² in a dry state in the case of car mats and ceiling members.

EXAMPLE

Preparation Examples (PE), Examples (EX), and Comparative Examples (CE) are given below for further illustrating the invention although the invention is not limited to these Examples. All parts and % are by weight.

Preparation Example 1

A 3-L glass container equipped with a stirrer, reflux condenser and thermometer was thoroughly purged of air with nitrogen. To the glass container were added 1,000 parts of deionized water, 20 parts of Emal O (Kao Co., Ltd., sodium laurylsulfate), and 30 parts of DKSNL-600 (Daiichi Kogyo Seiyaku Co., Ltd., polyoxyethylene lauryl ether). Stirring was started.

The internal temperature of the container was raised to 80° C., whereupon a mixture of 580 parts butyl acrylate, 300 parts ethyl acrylate, 100 parts acrylonitrile and 20 parts acrylic acid was continuously fed over 4 hours and then a mixture of 4 parts ammonium persulfate and 50 parts water continuously fed over 4 hours. Thereafter, reaction was effected at 80° C. for one hour. The reaction solution was cooled to 30° C., yielding an acrylate resin base emulsion having a solids content of 49.5%.

Preparation Examples 2 to 4

Several emulsions were obtained by effecting emulsion polymerization as in Preparation Example 1. The composition of the emulsions of Preparation Examples 1 to 4 and a commercial synthetic resin emulsion is shown in Table 1.

Preparation Example 5

To a ribbon mixer were fed 100 parts of ammonium polyphosphate (Pecoflame TC204P by Clariant, average particle size 8 μm) and 10 parts of hydrophobic silica (degree of hydrophobicity 45, average particle size 1.6 μm) which had been hydrophobized by contacting dry silica having a specific surface area of 120 m$^2$/g with dimethyldichlorosilane diluted with nitrogen and steam at 500° C. such that a carbon content per unit surface area fell in the range of 6.0 to $7.0 \times 10^{-5}$ g/m$^3$. The mixer was operated at a high speed of 1,000 rpm for one minute for agitation mixing. This operation yielded silica-coated ammonium polyphosphate. The coated ammonium polyphosphate was observed under a scanning electron microscope (SEM), finding that silica fines adhered to surfaces of ammonium polyphosphate particles to provide a dense and tight coverage.

Preparation Example 6

To a ribbon mixer were fed 100 parts of ammonium polyphosphate surface treated with amino-containing silicone oligomer (FRX-304 by Shin-Etsu Chemical Co., Ltd., average particle size 8 μm) and 10 parts of hydrophobic silica (degree of hydrophobicity 45, average particle size 1.6 μm) which had been hydrophobized by contacting dry silica having a specific surface area of 120 m$^2$/g with dimethyldichlorosilane diluted with nitrogen and steam at 500° C. such that a carbon content per unit surface area fell in the range of 6.0 to $7.0 \times 10^{-5}$ g/m$^3$. The mixer was operated at a high speed (1,000 rpm) for one minute for agitation mixing. This operation yielded silica-coated, organosilicon resin surface treated ammonium polyphosphate. The coated ammonium polyphosphate was observed under a SEM, finding that silica fines adhered to surfaces of organosilicon resin surface treated ammonium polyphosphate particles to provide a dense and tight coverage.

Preparation Example 7

To 100 parts of ammonium polyphosphate (FR CROS S 10 by Budenheim, average particle size 8 μm) were added 5 parts of a linear silicone fluid (KF-96H by Shin-Etsu Chemical Co., Ltd.) and 100 parts of toluene. The mixture was agitated for minutes, and the toluene was removed under reduced pressure. The residue was ground on a grinder, yielding silicone-treated ammonium polyphosphate having an average particle size of 10 μm.

Examples 1 to 7 and Comparative Examples 1 to 8

To a stainless steel container was added 100 parts of each of the emulsions of Preparation Examples 1 to 4 or a commercial emulsion. Agitation was started. With agitation continued, a predetermined amount of a dispersion liquid (solids 60%) of each of the treated ammonium polyphosphates of Preparation Examples 5 to 7 or commercial ammonium polyphosphate in water with the aid of a surfactant Latemul ASK (by Kao Corp.) was added, followed by one hour of agitation. Thereafter, deionized water was added for adjusting the solids content to 50±1%. Then a thickener Boncoat V (by Dainippon Ink & Chemicals, Inc., alkali viscosity buildup type acrylic emulsion) and 25% aqueous ammonia were added to the dispersion for thickening, yielding a coating composition having an increased viscosity of 30,000±3,000 mPa·s as measured at 25° C. by a Brookfield viscometer. The formulation of these coating compositions is shown in Tables 2 and 3.

A predetermined amount of each coating composition was applied to a commercial polyester woven fabric with a weight to of 400 g/m$^2$ and a commercial polypropylene non-woven fabric with a weight of 700 g/m$^2$, and dried at 130° C. for 5 minutes, completing samples.

The samples of Examples and Comparative Examples were examined for sew line fatigue, flame retardance, water resistance, stiffness, formaldehyde emission, and heat resistance. The samples of polyester woven fabric with a weight of 400 g/m$^2$ were used as car seats and examined for sew line fatigue, flame retardance, water resistance, stiffness, formaldehyde emission, and heat resistance, with the results shown in Table 4. The samples of polypropylene non-woven fabric with a weight of 700 g/m$^2$ were used as car mats and examined for flame retardance, water resistance, stiffness, formaldehyde emission, and heat resistance, with the results shown in Table 5.

The test methods and evaluation criteria are described below.

1. Sew Line Fatigue

Two pairs of pieces of 10 cm wide and 10 cm long were cut out from each of warp and weft directions. To the back surface of each piece, a urethane foam slab (density 0.02 g/cm$^3$, thickness 5 mm) and a backing fabric (nylon spun-bonded fabric, 40 g/m$^2$) of the same size were laid to form a laminate. Two laminates were laid with their front surfaces mated each other. Using a sewing machine, the assembly was sewed at 1 cm inside from the side edge. In this way, two sets of specimens were prepared for each of warp and weft directions. The specimen was mounted on a sew line fatigue testing machine (Yamaguchi Chemical Industry Co., Ltd.) which was operated under a load of 3 kg over 2,500 cycles. With the load of 3 kg kept applied, the sew line fatigue of the specimen was observed through a scale magnifier.

The term "sew line fatigue" refers to the distance between the sewing thread moved in the loading direction by repeated fatigue and the thread within fabric located nearest thereto, measured in unit 0.1 mm. An average of measurements at two locations is the sew line fatigue of the test specimen.

Rating Criterion
○: moving distance≧2.2 mm
×: moving distance>2.2 mm

2. Flame Retardance

Examined by the test method of US Federal Motor Vehicle Safety Standard FMVS S-302.

Rating Criterion for Car Seat
○: burnt distance≦38 mm
×: burnt distance>38 mm

Rating Criterion for Car Mat
○: burnt distance≦38 mm+burning time≦60 sec or burning rate≦10 cm/min
×: burnt distance>38 mm+burning time>60 sec+burning rate>10 cm/min 3. Water Resistance A water droplet having a diameter of 5 mm was dropped on the coated surface of fabric. It was examined whether or not the coated surface became slimy.

Rating Criterion
●: not slimy, no penetration of water into coated surface
○: not slimy
Δ: somewhat slimy
×: heavily slimy 4. Stiffness Examined by the 45° cantilever method of JIS L1079 (5.17A method). The higher the stiffness, the harder felt was the sample.

Rating Criterion for Car Seat
○: stiffness≦100
×: stiffness>100

Rating Criterion for Car Mat
○: stiffness>100
×: stiffness≦100

5. Formaldehyde Emission

A 2-L Tedlar° Bag (Dupont) was charged with 50 cm² of a sample, purged with nitrogen and sealed. The bag was held at 65° C. for 2 hours. Using a gas detector 91L (Gas Tech Co., Ltd.), formaldehyde was detected.

Rating Criterion
○: no formaldehyde
×: formaldehyde detected

6. Heat Resistance

The samples of polyester woven fabric and polypropylene non-woven fabric coated with different coating compositions were heat treated at 150° C. for one hour, after which a change of color on the coating surface was visually examined.

Rating A: no color change
Rating B: yellowed
Rating C: materially yellowed

TABLE 1

| Composition | Resin emulsion | | | | | | | |
|---|---|---|---|---|---|---|---|---|
| solids (%) | St | MMA | BA | EA | AN | AA | GMA | Solids (%) |
| Preparation Example 1 | | | 58 | 30 | 10 | 2 | | 49.5 |
| Preparation Example 2 | | 20 | 72 | | | 5 | 3 | 50.3 |
| Preparation Example 3 | 80 | | 18 | | | 2 | | 50.5 |
| Preparation Example 4 | | | 65 | 32 | | 3 | | 49.8 |

TABLE 1-continued

| Composition | Resin emulsion | Solids (%) |
|---|---|---|
| solids (%) | St MMA BA EA AN AA GMA | |
| Hydran HW-301 | urethane resin base emulsion, Dainippon Ink & Chemicals, Inc. | 45 |
| Sumikaflex 752 | ethylene/vinyl acetate resin base emulsion, Sumitomo Chemical Co., Ltd. | 50 |
| Nalstar SR-112 | SBR base emulsion, Nippon A&L Inc. | 50 |

St: styrene
MMA: methyl methacrylate
BA: butyl acrylate
EA: ethyl acrylate
AN: acrylonitrile
AA: acrylic acid
GMA: glycidyl methacrylate

TABLE 2

Coating composition for car seat

| Amount of composition, | Example | | | Comparative Example | | | | |
|---|---|---|---|---|---|---|---|---|
| as solids (pbw) | 1 | 2 | 3 | 1 | 2 | 3 | 4 | 5 |
| Preparation Example 1 | 100 | | | 100 | | 100 | 100 | |
| Preparation Example 2 | | 100 | | | 100 | | | 100 |
| Hydran HW-301 | | | 100 | | | | | |
| Preparation Example 5 | 150 | | 150 | | | | 0.5 | |
| Preparation Example 6 | | 150 | | | | | | 400 |
| Preparation Example 7 | | | | | | 150 | | |
| Terrages C-30 | | | | 100 | | | | |
| Terrages C-60 | | | | | 100 | | | |

Terrages C-30: Chisso Corp., melamine-coated ammonium polyphosphate
Terrages C-60: Chisso Corp., melamine/formaldehyde-coated ammonium polyphosphate

TABLE 3

Coating composition for car mat

| Amount of composition, | Example | | | | Comparative Example | | |
|---|---|---|---|---|---|---|---|
| as solids (pbw) | 4 | 5 | 6 | 7 | 6 | 7 | 8 |
| Preparation Example 3 | 100 | | 50 | | 100 | | 100 |
| Preparation Example 4 | | 100 | | | | 100 | |
| Sumikaflex 752 | | | 50 | | | | |
| Nalstar SR-112 | | | | 100 | | | |
| Preparation Example 5 | 50 | | 50 | | | | |
| Preparation Example 6 | | 50 | | 70 | | | 0.5 |
| Terrages C-30 | | | | | 10 | | |
| Terrages C-60 | | | | | | 15 | |

TABLE 4

Test results of car seats

|  | Example | | | Comparative Example | | | | |
| --- | --- | --- | --- | --- | --- | --- | --- | --- |
|  | 1 | 2 | 3 | 1 | 2 | 3 | 4 | 5 |
| Dry coating weight (g/m$^2$) | 140 | 120 | 100 | 100 | 110 | 160 | 140 | 110 |
| Sew line fatigue | ○ | ○ | ○ | ○ | ○ | ○ | ○ | x |
| Flame retardance | ○ | ○ | ○ | ○ | ○ | ○ | x | ○ |
| Water resistance | ● | ● | ● | Δ/x | Δ/x | ○ | ○ | ○ |
| Stiffness | ○ | ○ | ○ | ○ | ○ | ○ | ○ | ○ |
| Formaldehyde | ○ | ○ | ○ | ○ | ○ | x | ○ | ○ |
| Heat resistance | A | A | A | A | C | C | B | A |

TABLE 5

Test results of car mats

|  | Example | | | | Comparative Example | | |
| --- | --- | --- | --- | --- | --- | --- | --- |
|  | 4 | 5 | 6 | 7 | 6 | 7 | 8 |
| Dry coating weight (g/m$^2$) | 360 | 380 | 380 | 430 | 420 | 420 | 460 |
| Flame retardance | ○ | ○ | ○ | ○ | ○ | ○ | x |
| Water resistance | ● | ● | ● | ● | Δ/x | ○ | ○ |
| Stiffness | ○ | ○ | ○ | ○ | ○ | ○ | ○ |
| Formaldehyde | ○ | ○ | ○ | ○ | ○ | x | ○ |
| Heat resistance | A | A | A | A | B | B | B |

Japanese Patent Application No. 2005-357289 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a vehicle interior material comprising the steps of:
   feeding 100 parts by weight of phosphorus and nitrogen-containing non-halogen flame retardant particles and 0.1 to 20 parts by weight of hydrophobic silica fine particles having hydrophobic groups which are hydrophobized by contacting dry silica with dimethyldichlorosilane and having an average particle size of 0.001 to 5 μm to a mixer equipped with a high-speed agitation means having a revolution capability of about 100 to 5,000 rpm,
   agitating and mixing the phosphorus and nitrogen-containing non-halogen flame retardant particles and the hydrophobic silica fine particles to produce the phosphorus and nitrogen-containing non-halogen flame retardant particles coated with the hydrophobic silica fine particles,
   mixing 100 parts by weight as solids of a synthetic resin emulsion and 1 to 300 parts by weight of the phosphorus and nitrogen-containing non-halogen flame retardant particles coated with the hydrophobic silica fine particles to produce a coating composition,
   coating the coating composition onto the vehicle interior material, and
   drying the coated vehicle interior material.

2. The method of claim 1, wherein said synthetic resin emulsion is selected from the group consisting of (meth)acrylate resin base emulsions, styrene/acrylate copolymer base emulsions, urethane resin base emulsions, ethylene/vinyl acetate copolymer base emulsions, rubber base emulsions, and mixtures thereof.

3. The method of claim 1, wherein the particulate phosphorus and nitrogen-containing non-halogen flame retardant is selected from the group consisting of guanidine phosphate, ammonium phosphate, melamine phosphate, ammonium polyphosphate, melamine-surface-treated ammonium polyphosphate, silicon compound-surface-treated ammonium polyphosphate, and mixtures thereof.

4. The method of claim 3, wherein the particulate phosphorus and nitrogen-containing non-halogen flame retardant is ammonium polyphosphate.

5. The method of claim 3, wherein the particulate phosphorus and nitrogen-containing non-halogen flame retardant is silicon compound-surface-treated ammonium polyphosphate.

6. The method of claim 1, wherein a coated non-halogen flame retardant has an average particle size of 3 to 35 μm.

7. The method of claim 1, wherein the vehicle interior material is a car seat.

8. The method of claim 1, wherein the vehicle interior material is a car mat.

9. The method of claim 1, wherein the vehicle interior material is a ceiling member.

10. The method of claim 7, wherein the coating weight of the coating composition of the car seat is 30 to 200 g/m$^2$ in a dry state.

11. The method of claim 8, wherein the coating weight of the coating composition of the car mat is 300 to 600 g/m$^2$ in a dry state.

12. The method of claim 9, wherein the coating weight of the coating composition of the ceiling member is 300 to 600 g/m$^2$ in a dry state.

* * * * *